(12) United States Patent
Fung et al.

(10) Patent No.: US 9,286,603 B2
(45) Date of Patent: Mar. 15, 2016

(54) ACTIVITY MANAGEMENT METHOD

(75) Inventors: Nicholas Ho Chung Fung, Singapore (SG); Chu Yong Sang, Singapore (SG); Kam Hong Shum, Singapore (SG)

(73) Assignee: ONEEMPOWER PTE LTD, Singapore (SG)

(*) Notice: Subject to any disclaimer, the term of this patent is extended or adjusted under 35 U.S.C. 154(b) by 2054 days.

(21) Appl. No.: 10/174,366

(22) Filed: Jun. 17, 2002

(65) Prior Publication Data

US 2003/0163427 A1    Aug. 28, 2003

(30) Foreign Application Priority Data

Feb. 27, 2002  (SG) .................. 200201145-0

(51) Int. Cl.
*G06Q 20/00* (2012.01)
*G06Q 20/20* (2012.01)
*G06Q 30/02* (2012.01)

(52) U.S. Cl.
CPC ............. *G06Q 20/20* (2013.01); *G06Q 30/02* (2013.01)

(58) Field of Classification Search
USPC ............. 705/10, 53, 15, 52, 14, 38, 16, 39; 235/492; 709/228; 713/155
See application file for complete search history.

(56) References Cited

U.S. PATENT DOCUMENTS

| | | | | |
|---|---|---|---|---|
| 5,550,734 A * | 8/1996 | Tarter et al. | ........................ | 705/2 |
| 5,576,951 A * | 11/1996 | Lockwood | ....................... | 705/27 |
| 5,724,425 A * | 3/1998 | Chang et al. | .................... | 705/52 |
| 5,870,721 A * | 2/1999 | Norris | .............................. | 705/38 |
| 5,901,303 A * | 5/1999 | Chew | ............................. | 711/115 |
| 5,995,947 A * | 11/1999 | Fraser et al. | .................... | 705/38 |
| 6,014,645 A * | 1/2000 | Cunningham | .................. | 705/38 |
| 6,018,718 A * | 1/2000 | Walker et al. | ................... | 705/14 |
| 6,088,686 A * | 7/2000 | Walker et al. | ................... | 705/38 |
| 6,129,274 A * | 10/2000 | Suzuki | .......................... | 235/381 |
| 6,377,935 B1 * | 4/2002 | Deaton et al. | ............. | 705/14.41 |
| 6,450,407 B1 * | 9/2002 | Freeman et al. | ............... | 235/492 |
| 6,456,981 B1 * | 9/2002 | Dejaeger et al. | ................ | 705/14 |
| 6,571,216 B1 * | 5/2003 | Garg et al. | ...................... | 705/14 |
| 6,839,690 B1 * | 1/2005 | Foth et al. | ....................... | 705/53 |
| 6,925,441 B1 * | 8/2005 | Jones et al. | ..................... | 705/10 |

(Continued)

FOREIGN PATENT DOCUMENTS

| | | |
|---|---|---|
| EP | 661675 | 7/1995 |
| EP | 1111557 A2 | 6/2001 |

(Continued)

OTHER PUBLICATIONS

PCT International Search Report—Application No. PCT/SG02/00080; Filing Date: May 7, 2002.

(Continued)

*Primary Examiner* — Tsan-Yu J Huang
(74) *Attorney, Agent, or Firm* — Intellectual Property Law Group LLP

(57) ABSTRACT

The invention provides a method of managing an activity, including: a user making a request to engage in an activity with a first of a plurality of providers; and the user presenting to the first provider with a personal data storage device, the device provided with identification data to identify the user and a user profile comprising a plurality of sets of user profile data, each set of user profile data pertaining to at least one of the plurality of providers; wherein the user's request to engage in the activity is assessed according to one or more sets of the user profile data.

41 Claims, 3 Drawing Sheets

(56) References Cited

U.S. PATENT DOCUMENTS

| | | | |
|---|---|---|---|
| 6,993,580 B2* | 1/2006 | Isherwood et al. | 709/225 |
| 7,117,369 B1* | 10/2006 | Burns et al. | 713/182 |
| 2001/0016871 A1* | 8/2001 | Fujita | G06Q 20/20 709/203 |
| 2001/0037451 A1* | 11/2001 | Bhagavatula et al. | 713/155 |
| 2001/0047307 A1* | 11/2001 | Bennett et al. | 705/26 |
| 2001/0051996 A1* | 12/2001 | Cooper et al. | 709/217 |
| 2002/0023230 A1 | 2/2002 | Bolnick et al. | |
| 2002/0026411 A1* | 2/2002 | Nathans et al. | 705/38 |
| 2002/0035543 A1* | 3/2002 | Shedd et al. | 705/44 |
| 2002/0046091 A1* | 4/2002 | Mooers et al. | 705/14 |
| 2002/0052885 A1* | 5/2002 | Levy | G06F 17/30067 |
| 2002/0082925 A1* | 6/2002 | Herwig | 705/16 |
| 2002/0138418 A1* | 9/2002 | Zarin et al. | 705/38 |
| 2002/0143961 A1* | 10/2002 | Siegel | G06F 21/6245 709/229 |
| 2002/0147766 A1* | 10/2002 | Vanska et al. | 709/203 |
| 2002/0152123 A1* | 10/2002 | Giordano et al. | 705/14 |
| 2002/0174013 A1* | 11/2002 | Freeman et al. | 705/14 |
| 2003/0065576 A1* | 4/2003 | Harris et al. | 705/26 |
| 2003/0097451 A1* | 5/2003 | Bjorksten et al. | 709/228 |
| 2003/0115126 A1* | 6/2003 | Pitroda | 705/36 |
| 2003/0225729 A1* | 12/2003 | Maloche et al. | 707/1 |

FOREIGN PATENT DOCUMENTS

| | | |
|---|---|---|
| EP | 1111557 A3 | 1/2004 |
| GB | 2338329 | 12/1999 |
| JP | 2001-167241 | 6/2001 |
| JP | 2002-15293 | 1/2002 |
| JP | 2001-357365 | 12/2002 |
| SG | 9702499-6 | 7/1997 |
| SG | 200105460-0 | 1/2001 |
| WO | WO 99/52052 | 10/1999 |
| WO | WO 99/56495 | 11/1999 |
| WO | WO 00/17794 A | 3/2000 |
| WO | WO 01/01315 | 1/2001 |
| WO | WO 01/07987 A | 2/2001 |
| WO | WO 01/35360 | 5/2001 |
| WO | WO 01/37161 | 5/2001 |
| WO | WO 01/37161 A2 | 5/2001 |
| WO | WO 01/44998 | 6/2001 |
| WO | WO 02/42961 A1 | 5/2002 |
| WO | WO 02/42962 A1 | 5/2002 |

OTHER PUBLICATIONS

United Kingdom search Report—Application No. GB 0302998.0; Filing Date: Jul. 3, 2003.

Australian Patent Office Search Report—Application No. SG 200201145-0; Filing Date: Feb. 27, 2002.

* cited by examiner

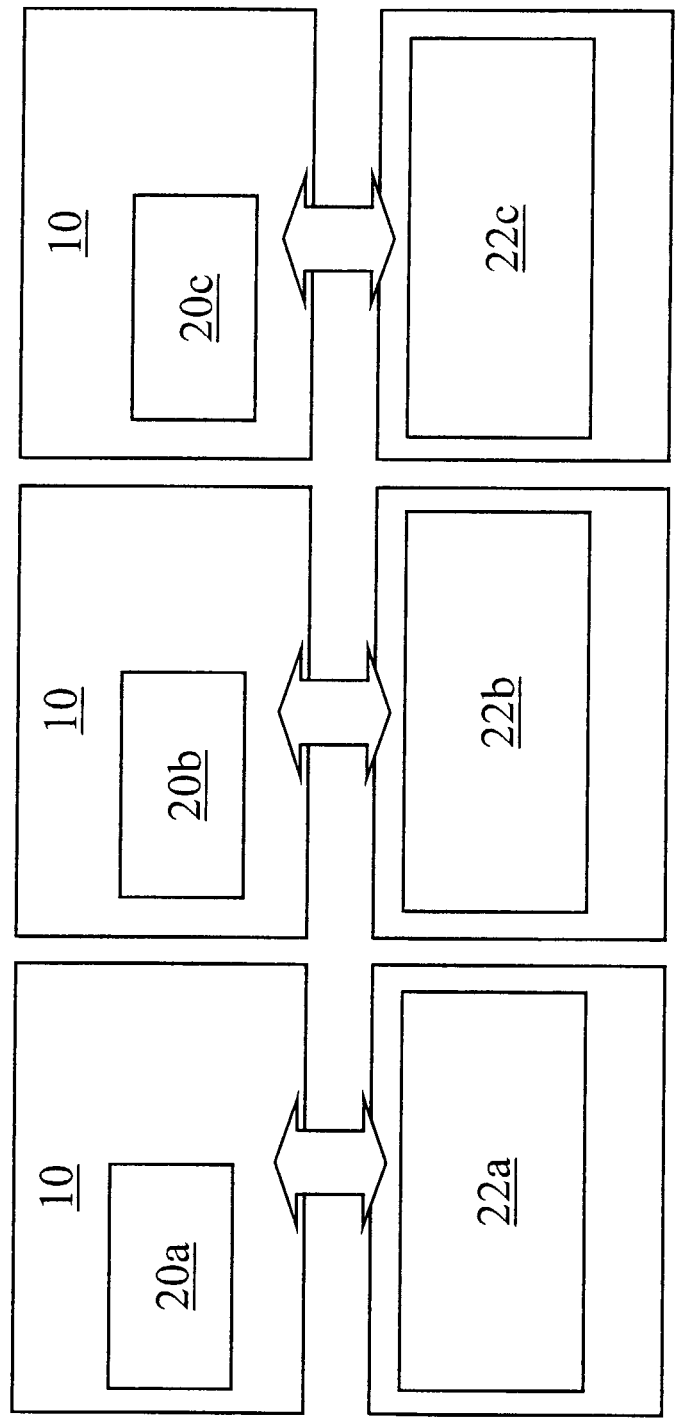

ACTIVITY MANAGEMENT METHOD

FIELD OF THE INVENTION

The present invention relates to a method of managing an activity and a method of providing a response to a user of a particular but by no means exclusive application in processing a request made by a user to engage in a transaction with a provider of goods or services.

BACKGROUND OF THE INVENTION

Existing methods of conducting certain transactions employ 'customer relationship management' (CRM), where the customer is accorded different benefits or privileges, or given particular offers and marketing messages, depending on information known about the customer by the provider of the desired good or service. Such CRM practices involve apparatuses that are networked to a central server or processing system that is maintained by the entity providing the good, service or some associated benefit (such as "frequent flyer points" or "frequent flyer miles") and information about each customer.

However, existing CRM practices have several drawbacks. In particular, they require interconnection and communication in real-time to the central server and/or they generally are cumbersome to implement; as a result they are typically expensive to operate. In addition, entities participating in collaborative CRM face many hurdles in sharing what they know about a customer, owing to both technological constraints and consumer privacy concerns.

SUMMARY OF THE INVENTION

It is an object of the present invention, therefore, to obviate at least some of the difficulties associated with existing customer relationship management systems.

According to a first broad aspect of the present invention, there is provided a method of managing an activity, including:
 a user making a request to engage in an activity with a first of a plurality of providers; and
 said user presenting to said first provider a personal data storage device, said device provided with identification data to identify said user and a user profile comprising a plurality of sets of user profile data, each set of user profile data pertaining to at least one of said plurality of providers;
 wherein said user's request to engage in said activity is assessed according to one or more sets of user profile data.

Preferably said user's request to engage in said activity is assessed if possible according to the set of user profile data pertaining to said first provider, and if not possible according to the user profile data pertaining to said first provider and one or more sets of user profile data pertaining to one or more other providers, or only according to one or more sets of user profile data pertaining to one or more other providers.

Thus, even though the user may make a request to engage in an activity with a first provider, the activity may in fact be approved according to both the user profile data pertaining to that first provider and also the user profile data pertaining to either a second provider or a plurality of second providers. Indeed, the activity could be approved according to the user profile data of the second provider or a plurality of second providers only, if—for example—the user profile data of the first were entirely inadequate. It should be noted that this method does not exclude the possibility of conducting other checks on the user's acceptability.

The personal data storage device can be read by any suitable means, but this would typically comprise an electronic reader.

This aspect of the invention is also useful for environments where data communications are not available, not reliable or expensive, as it makes available the CRM and activity management capabilities off-line so that, for example, a bonus can be distributed at the point of interaction.

Preferably, said method further includes determining any response to which said user is entitled.

Preferably at least one set of user profile data includes activity data concerning any past activities said user has engaged in with a provider or providers to which the set of user profile data relates, and the step of assessing said user's request is based at least partly on said activity data.

Preferably at least one set of user profile data includes response data concerning any past responses received by said user, and assessing said request is based at least partly on said response data.

Preferably, at least one set of user profile data includes personal data and assessing said request is based at least partly on said personal data.

Preferably, at least one set of user profile data includes predictive data concerning future activities in which said user is likely to engage, and assessing said request is based at least partly on said predictive data.

Preferably each of said sets of user profile data constitutes a sub-profile of said user profile.

Preferably said method includes updating said user profile. More preferably said method includes updating said set of user profile data pertaining to said first provider to include additional information to reflect said activity.

Preferably said method includes updating said set of user profile data pertaining to said first provider to reflect said activity if said activity is completed.

Preferably said method includes updating said set of user profile data pertaining to said first provider to reflect any response received by said user.

Preferably said method includes updating the set of user profile data pertaining to at least one other provider.

Preferably said set of user profile data pertaining to at least one other provider is only modified if said at least one other provider has granted access rights to said first provider.

Preferably said method includes controlling access to different parts of the user profile data shared by selected providers through use of a digital certificate and user profile data coordinates, to thereby enable access rights to be modified by altering the digital certificate.

Preferably said user is required to provide consent to the access of data in relation to selected request to engage in an activity.

Preferably said user is required to provide identification data in relation to selected requests to engage in an activity.

According to a second broad aspect of the present invention, there is provided a method of providing a response to a user, comprising:
 said user making a request to engage in an activity with a first of a plurality of providers;
 said user presenting to said first provider a personal data storage device, said device provided with identification data to identify said user and a user profile comprising a plurality of sets of user profile data, each pertaining to one of said plurality of providers; and
 determining any response to which said user is entitled upon making said request;

wherein said user's entitlement to said response is assessed at least according to said user profile data pertaining to one or more of said providers.

Preferably said user's entitlement to said response is assessed if possible according to the set of user profile data pertaining to said first provider, and if not possible according to the user profile data pertaining to said first provider and one or more sets of user profile data pertaining to one or more other providers, or only according to one or more sets of user profile data pertaining to one or more other providers.

Thus, for example, where the activity is a purchase of goods or services a user might be entitled to a response in the form of a discount based on spending history with that—or some other—provider of goods or services.

Preferably at least one set of user profile data includes activity data concerning any past activities said user has engaged in with a provider or providers to which the set of user profile data relates, and determining any response to which said user is entitled is based at least partly on said activity data.

Preferably at least one set of user profile data includes response data and said determination of any response is based at least partly on said response data.

Preferably, at least one set of user profile data includes personal data and said determination of any response is based at least partly on said personal data.

Preferably, at least one set of user profile data includes predictive data concerning future activities in which said user is likely to engage, and said determination of any response is based at least partly on said predictive data.

According to a third broad aspect of the present invention, there is provided a method of managing an activity, comprising:

each of a plurality of providers maintaining a database having a user profile pertaining to said user and comprising a set of user profile data; and said user making a request to engage in an activity with a first of said plurality of providers;

wherein said user's request to engage in said activity is assessed if possible according to the set of user profile data of said user maintained by said first provider and, if not possible, either according to the set of user profile data of said user maintained by said first provider and the set of user profile data of said user maintained by one or more other providers, or only according to the set of user profile data of said user maintained by one or more of said other providers.

Thus, even though the user may make a request to engage in an activity with a first provider, the activity may in fact be approved according to both the user profile data maintained by that first provider and also the user profile data maintained by another provider or a plurality of other providers. Indeed, the activity could be approved according to the user profile data maintained by the second provider or a plurality of other providers only, if—for example—the user profile data maintained by the first were inadequate. It will be appreciated, of course, that this method does not exclude other checks on the user's acceptability.

The activity may be of any kind, including a purchase but also a request for wages. In the last case the 'response' may be those wages or some other employment response.

According to a fourth broad aspect of the present invention, there is provided a method of providing a response to a user, comprising:

each of a plurality of providers maintaining a database having a user profile pertaining to said user and comprising a set of user profile data;

a user making a request to engage in an activity with a first of said plurality of providers; and determining any response to which said user is entitled upon making said request;

wherein said user's entitlement to said response is assessed if possible according to the set of user profile data of said user maintained by said first provider and, if not possible, either according to the set of user profile data of said user maintained by said first provider and the set of user profile data of said user maintained by one or more other providers, or only according to the set of user profile data of said user maintained by one or more of said other providers.

According to a fifth broad aspect of the invention, there is provided a personal data storage device for use in managing an activity between a user and a provider, said device provided with identification data to identify said user and a user profile comprising a plurality of sets of user profile data, each pertaining to one of said plurality of providers.

Preferably each of said sets of user profile data constitutes a sub-profile of said user profile.

Preferably said personal data storage device has magnetic, optical or electronic memory storage means for storing said user profile. More preferably said personal data storage device has magnetic, optical, or electronic memory storage means for storing said user profile and said identification data.

In one embodiment, the personal data storage device comprises a credit card sized card with a memory storage means in the form of a magnetic strip; in another embodiment, the personal data storage device comprises a smart card or a chip card.

In some embodiments, the identification data could simply be printed on the personal data storage device, or embossed in the form of, for example, raised letters.

Herein the term "user" is used to refer to an individual, a group of individuals, or other entity which makes requests to engage in activities. An example of a user is a customer who seeks to obtain goods and services from a provider. In other embodiments, a user may be an employee etc.

Herein the term "provider" is used to refer in general terms to an entity which can provide goods, services or some other response to a user's request to engage in an activity. Examples of providers are retailers, employers, airlines, hotels, e-merchants, financial institutions, etc. Providers may be locally based or based elsewhere—e.g. in other countries.

Herein the term "personal storage device" is used to refer to a device comprising a data storage facility such as a credit-card sized card with a magnetic strip or chip, or with optical storage features, or a mobile device such as a mobile phone or personal digital assistant, or a chip embedded in objects such as watches, toys, pendants, etc, which is suitable for storing data and which can be used during an activity engagement with the provider.

The term "activity" is used to refer generically to any request a user may make—e.g. a purchase request, a wages request etc.

"Activity data" in a user profile may include, any past activities, for example, purchase data such as dollars spent, currency units, products bought, number of units produced, number of days worked, number of days on leave, number of clicks through a website, number of times a game is played etc. In contrast, "Predictive data" may include predictive indices of future activities—for example, an index indicating the likelihood of when a certain activity will take place.

"Personal data" in a user profile may include data of birth, gender, social status, income, qualifications, provider relationship information, etc.

A "response" will typically be the provision of a benefit such as a discount, however, it may be a price, a message, an approval (e.g. of credits, of right, of access), etc.

The present invention, therefore, ameliorates the technological difficulty of sharing and exploiting the information known about the user at the point of interaction between user and provider, and enables each interaction to be carried out on a more fully informed basis by participating providers such as businesses or non-profit organizations (e.g. governmental bodies), as an individual organization may not have as much information or as complete a user profile as a collection of organizations. This invention enables each participating provider, therefore, to maintain its own data within the profile, with providers sharing, in effect, the use of some or all of their respective profiles or sub-profiles when a user engages in an activity with one of them. For example, according to some embodiments of the invention, when a user makes a request to engage in an activity, a computer system (that implements the data processing steps of the invention) may be programmed to use some of the profile data maintained by a second provider in the event the first provider's own profile data are insufficient for the activity to complete satisfactorily. Use of the profile data from the second provider may be limited to a simple query (e.g. retrieving an index of the user's income band) or may comprise the retrieval of a complex derivative index that answers questions such as 'Probability that user requires a housing mortgage loan'. In some embodiments, the personal data storage device could then, using rules embedded in it, compute and return such an index without revealing the details in the component profile data. The type of access accorded to a particular provider would be subject to commercial arrangements made between that provider and the providers with whom profile data are shared. Such access could be controlled, for example, by Digital Certificates issued to each participating provider, where each Digital Certificate contains the authorization codes that are validated by the personal data storage device when an attempt is made to access profile data.

In some embodiments, this invention also addresses the problem of consumer privacy by allowing control over the use of the profile data to be placed in the hands of the user, so that—in some embodiments—use only of the profile data can be shared between different providers, this use is performed only with the user's consent at the point of interaction, and without the profile data being released to the sharing parties, such consent being typically provided, for example, by presentment of a PIN, password or biometric identification by the user to the point-of-interaction device. Thus, embodiments of the invention enable "legitimate permission marketing" where providers may have access to user's profile data (subject to the user's consent) and offer relevant goods or services to the user at the point of interaction without violating the user's privacy.

This invention enables profile data to be updated with current information, and thus facilitates higher accuracy in the decision making process for each encounter with the user. For example, in CRM, instantaneous updating of profile data is traditionally not cost-effective owing to the existence of large and complex applications which prohibit the implementation of CRM rules and practices integrated with engagement in an activity. Embodiments of this invention bring CRM functionality to the point of interaction with the user and avoids the complications of having to integrate with existing 'legacy' systems, which would typically involve extensive change, hence making CRM much more practical and achievable.

With embodiments of this invention, each provider participating in the Collaborative CRM or Partner CRM scheme benefits from the collective knowledge about the user, while the user benefits from the better informed and faster decisions made by the providers, and at the same time the user has full control over the use of and access to the user profile, and all of these are done at the point of interaction without the need for complex integration of the provider's information.

BRIEF DESCRIPTION OF THE DRAWINGS

In order that the present invention may be more clearly ascertained, preferred embodiments will now be described, by way of example, with reference to the accompanying drawings, in which:

FIGS. 2A, 2B and 2C are schematic representations of three possible embodiments of the Token of FIG. 1;

DETAILED DESCRIPTION OF THE INVENTION

Figure 1:
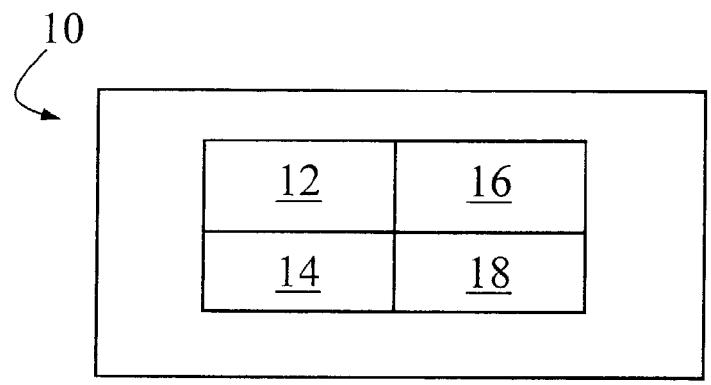
FIG. 1 is a schematic diagram of a personal data storage device (or Token) for use with a preferred embodiment of the present invention.

A method of managing an activity according to a preferred embodiment of the present invention, will now be described in detail.

In this method, the user profile is stored on a personal data storage device (referred to below as a 'Token'). Either the Token or the reader for reading the Token (with its controlling personal computer, point of sale terminal, personal digital assistant, cell phone or other mobile device) is programmed to make decisions about the way the interaction should progress. The user profile is stored in the Token in the form of Profile States, each Profile State—or set of user profile data—constituting indices encoding characteristics of the user. This data is used in and/or derived from formulae which may range from simple expressions establishing mathematical relationships between activity and/or other attribute data, to complex, statistical models derived empirically from observation of large numbers of users, their average behaviour and the statistical relationship between behaviour and other characteristics of the user. Variables in the formulae may include "Predictive data" relating to predicted behaviour of the user, such predictions being derived either from empirical observations or from mathematical projections or both. Each user activity involving use of the Token may result in the user profile in the Token being modified to reflect the transaction.

Profile State data may be Boolean (True or False), numerical, quantitative or textual data. The data in a single Profile State may constitute composite information, for example the user's gender, age, marital status, family size and income band.

Profile States may instead of the data itself, be used to hold pointers or location information and access keys and secret codes to the actual data, which data may be stored in a location external to the Token, herein referred to as "Extended Profile Data". The access keys and secret codes may be assigned by user or provider, depending on the requirement, and the keys and secret codes may be used for encryption of the data and/or for access control in the form of passwords or PINs. Such an embodiment has the dual advantage of greatly increasing the amount of data available for processing at the time of the activity in environments where the network connectivity permits access to the Extended Profile Data, as well as retaining user control over the data access. For example, the Extended Profile Data may reside in a host computer of a provider and not be available on the Token. Such Profile States are subject to the same access rules as the those Profile States containing data, including the rules for shared access between providers.

In addition, the Profile States are further organized into sets referred to as Profile Lines and sets of Profile Lines are organized into Profile Planes. Access to each of these is controlled using a cryptographically-based verification scheme using Digital Certificates.

A Digital Certificate contains data pertaining to the provider's identity, codes indicating the types of access the system or provider is permitted, a version index indicating the validity period of the Certificate, the coordinates to the Profile States, Lines and Planes that are accessible, permitted functions relating to each of the coordinate sets, and a cryptographically generated hash value known as a Digital Signature which can be used by the Token to verify the authenticity of the Digital Certificate. The Digital Signature is a function of all the data in the Digital Certificate and cryptographic keys known only to the issuer of the Token and/or owner of the Profile State, Line or Plane with which the Digital Certificate is associated.

By issuing different Digital Certificates to different systems or providers, the right of each system to use particular parts of the user profile can be restricted or permitted as the case may be, thus allowing controlled sharing of the use of the user profile. Access rights are controlled at the functional level as well, thus allowing each system to be limited to accessing a set of the user profile for any combination of functions including decision making, modification or viewing.

The Token is managed by an Operator, who may be responsible for some or all of the activities in operating the Token and the system, including overseeing the procuring, initializing and issuance of Tokens, procuring, initializing, programming, installation, maintenance and operations of the system, providing facilities for the analysing of user data and generating the relevant user profiles for loading into Tokens, and setting up collaborations between providers who may wish to benefit from the use of the Token and/or from collaboration with other participating providers, and providing general services to support users.

The Operator may or may not be a provider and may or may not be the Token issuer.

According to the method of this embodiment, the following typical steps take place in one practical embodiment.

The Token is loaded with an initial user profile and, optionally, mathematical formulae for computing new values of the indices making up the Profile if the Token has computational capabilities.

The system is used by a provider such as a retailer offering, for example, hire purchase of goods, and is loaded with a script defining the processing steps to be taken depending on the Profile, computational formulae to perform further derivations based on Profile State inputs from the Token, as well as a Digital Certificate or set of Digital Certificates providing the system access to the relevant parts of the Profile. When a user (in this case a customer) makes a request to engage in the activity of hire purchasing goods, the script in the system is configured to authorize loans in the form of hire purchase of goods to users based on the set of user profile data pertaining to the retailer, the actual credit limit being a function of the customer (user) profile.

If the customer requires a loan amount larger than that permitted based on the customer (user) profile data available to the system, (in this case the set of customer profile data of the retailer) the system prompts the customer for consent to access a second set of customer profile data, which may comprise customer's activities relating to a different provider (such as a financial institution) which is relevant to the customer's credit worthiness. With the customer's consent (and prior arrangement between the retailer and the financial institution), the system is provided with the access rights to receive a response from the Token for a specific query, the response being in the form of an index which is then used by the script to compute the customer's revised credit rating. The customer's consent to check other customer profile data sets may be given in advance and stored in the Token or may be given at the time of activity through presentment of a PIN, password or some biometric means of identification.

In another embodiment, the method can be used in marketing activities, where a provider such as a department store takes advantage of the opportunity to interact with a user who is a customer in order to promote goods and services of partners who may wish to access customers of the department store.

In this embodiment the system comprises a point-of-sale terminal (POS). The Token is issued by a bank, and the department store is a participating provider in the use of the Token, i.e. its customers are customers who hold these Tokens.

Information about the customer's activities (including purchase activities) is captured in the customer (user) profile through formulae that use as inputs: personal data (e.g. age, sex, gender); data pertaining to past activities; the current activity; and expected future activities, in order to derive an index that can be used for marketing decisions such as the pricing of goods or the type of entitlements and rewards that the customer may be offered. The formulae are stored and/or executed in the Token and/or in the system, depending on the circumstances of implementation, including the type of Token used.

One of the simplest forms is where the activities are purchases. In this case a formula specifies that X Bonus Points are awarded to a customer for every dollar (or other currency unit) spent, allows Bonus Points to be 'redeemed' by offsetting future purchases, and tracks such redemptions in order to monitor customer response.

In this second embodiment, one Profile State (Profile State A) is dedicated to tracking the total amount of purchases made by customer over a promotion period; the promotion period is encoded in rule scripts embedded in the POS.

Each time a payment transaction is initiated, the POS displays the amount of Bonus Points due to the customer, derived by converting the total transaction amount in Profile State A and deducting the amount of points redeemed to-date (which is tracked in Profile State B), and allows the customer to choose to redeem the Bonus Points as part of the current payment transaction. On completion of the transaction, the total amount of Bonus Points redeemed is recorded in Profile State B, whilst the total spent in the current transaction is added to Profile State A.

Further, the Bonus Points may be redeemed for benefits or entitlements at other participating vendors; for example, the customer—at vendor P—may choose to redeem or 'trade-in' 1000 Bonus Points for a $20 'virtual coupon' that can then be consumed at vendor Q. To effect this, the system adds the redemption amount (i.e. 1000 Bonus Points) to Profile State B to indicate that 1000 Bonus Points have been consumed, and updates Profile State C, which in this example is designated the transfer Profile State recognized by vendor Q, such that when customer goes to vendor Q and makes a transaction to redeem the virtual coupon for a $20 purchase, the system at vendor Q recognizes the coupon credit in Profile State C and increments another Profile State (say, D) to indicate that the customer has consumed the credit in Profile State C.

By accumulating totals in Profile States pertaining to respective activity data (e.g. purchase data and redemption data), it is possible to track consumer actions without losing information. By limiting access to the Profile State only to participating provider(s), this method allows multiple providers to either share or track their own points in the customer profile, using their own Profile States, in a secure way. Shared Profile States allow providers to participate in common customer reward schemes. Private Profile States which are not shared allow providers to operate their own schemes.

Access is provided by issuing Access Certificates to providers, where each provider is given Access Certificates for accessing only the Profile States, Lines or Planes that it has been allocated.

In addition, the user profile may further be used to select other marketing messages to be presented to the customer. For example, users whose profiles indicate frequent purchases of golfing equipment may be targeted for marketing messages pertaining to golf equipment, golf club memberships, golfing holidays and loans for such activities.

At selected systems where access to the back-end host system is practical and economic, the system may also automatically access the remote host to retrieve any updates due for the user profile in the Token during the interaction, as well as to (optionally) submit the latest customer profile data to the host system for storage and further analysis. A key aspect of this embodiment is to combine judicious use of online access with off-line processing to achieve still more practical profile-driven interaction systems. In particular, online access to the central host is expected to take place most frequently when the Token is used on the Internet. Before the system can access any functionality in the Token, the system and Token may be programmed to first authenticate each other through a series of data exchanges based on a prescribed communication protocol which incorporates the use of industry standard cryptographic algorithms such as Data Encryption Standard (DES), RSA cryptography, Elliptic Curve Cryptography or the Advanced Encryption Standard (AES).

In both the above embodiments, the method employs a device programmed to interact with the Token to carry out the mutual authentication process, access and interpret the Profile and results returned from the Token, and effect transactions (or activities) interactively taking into account the results and information arising from the use of the information from the Token. Such a device would typically comprise a processing unit, memory for program and data storage, software programs, displays for user to view system responses, keyboard for user to enter interaction-related details and at least one input/output device for interacting with a Token—for example a chip card reader for reading a chip card, an infra-red communication port for communicating with a mobile phone or personal digital assistant (PDA), as well as an optional capability to communicate with a remote host system through some means of data communication for the purpose of enhancing the functionality or complementing the functionality and for processing the transaction or activity.

The system is able to provide secure storage for information collected as a result of interactions with Tokens, and to transmit this information to remote systems for further processing if required by the circumstances. FIG. 1 is a schematic diagram of a Token 10 according to the above described embodiments, showing the processor unit 12, memory 14, input/output unit 16 and software 18.

The processor unit 12 carries out instructions contained in the software 18.

The software 18 contains the algorithm for processing the data stored in the memory 14; the software 18 itself may also be stored in memory 14 (e.g. Read-only Memory or ROM).

The memory 14 typically comprises any of the various suitable memory types, such as ROM, Random Access Memory or RAM or electrically erasable Programmable Read-only Memory, or EEPROM.

The software 18 is stored in ROM, while the EEPROM stores the user profile and related data required on a semi-permanent basis. The RAM is typically used only during execution of the software 18.

Input-output unit 16 allows data to be exchanged with the external system in which the Token 10 is used, and can take the form of:

physical lines (e.g. electrical signals carried on electrical contacts following standards such as EIA RS 232c, T=0 or T=1 protocols as prescribed in IS 7816 Part III etc;

infra-red light signals;

audio signals, in which sound transmission from the Token is encoded to carry information between Token and System; and radio frequency signals using protocols such as those specified in IS 14443 for chip cards, or GSM, WAP, GPRS, Bluetooth, etc for other device types.

The Token 10 may take forms other than a chip card, in which the active component is the chip and the overall Token is credit-card like. Other possible embodiments include PDAs, mobile phones, watches and any portable gadgets with the active component embedded in them.

FIGS. 2A, 2B and 2C depict schematically three possible Token-system interactions. In FIG. 2A, the Token 10 is in the form of a chip card, with active components 20a, while the system 22a is in the form of a point-of-sale terminal with a chip card reader which may or may not be connected to a host computer or a PC with chip card reader on an internet accessing host.

In FIG. 2B, the Token 10 is in the form of a personal digital assistant (PDA), with active components 20b, while the system 22b is an application server on a network connected to a host system.

In FIG. 2C, the Token 10 is in the form of a mobile telephone, with active components 20c, while the system 22c is the mobile phone network and an application server.

In each case, the Token 10 is presented to the system 22 (i.e. the hardware device, etc. maintained by a provider, etc.), and the following process occurs:

the system 22a,b,c initiates an exchange of identification information with the Token 10;

Based on this information, a mutual authentication process occurs in which cryptographically encrypted data exchanged between the two parts (i.e. system 22a,b,c and Token 10 respectively) enables each part to verify that the other part is genuine;

During this exchange, the system 22a,b,c presents to the Token 10 its credentials in the form of Digital Certificates that establish its right to access the relevant Profile Planes;

After the Token 10 verifies the Digital Certificates, access is granted.

The information on the types of access that the system 22a,b,c may be granted is embedded in the Digital Certificates, and the types of access include the following:

Profile query—in which system 22a,b,c is able to query the Token 10 as to whether the user profile meets a particular Profile index combination; in this type of access no raw data is released and the index information may be a dynamically generated value incorporating a combination of historical, current and predicted values, or a derivative result indicating a condition (True or False, or degree or level);

Profile update—in which the system 22a,b,c is permitted to submit data to the Token 10 for updating the relevant user profile indices; and Data retrieval—in which raw data stored in the Token 10 is retrieved by the system 22a,b,c, such that the computation and application of relevant formulae is in the system 22a,b,c.

Figure 3:
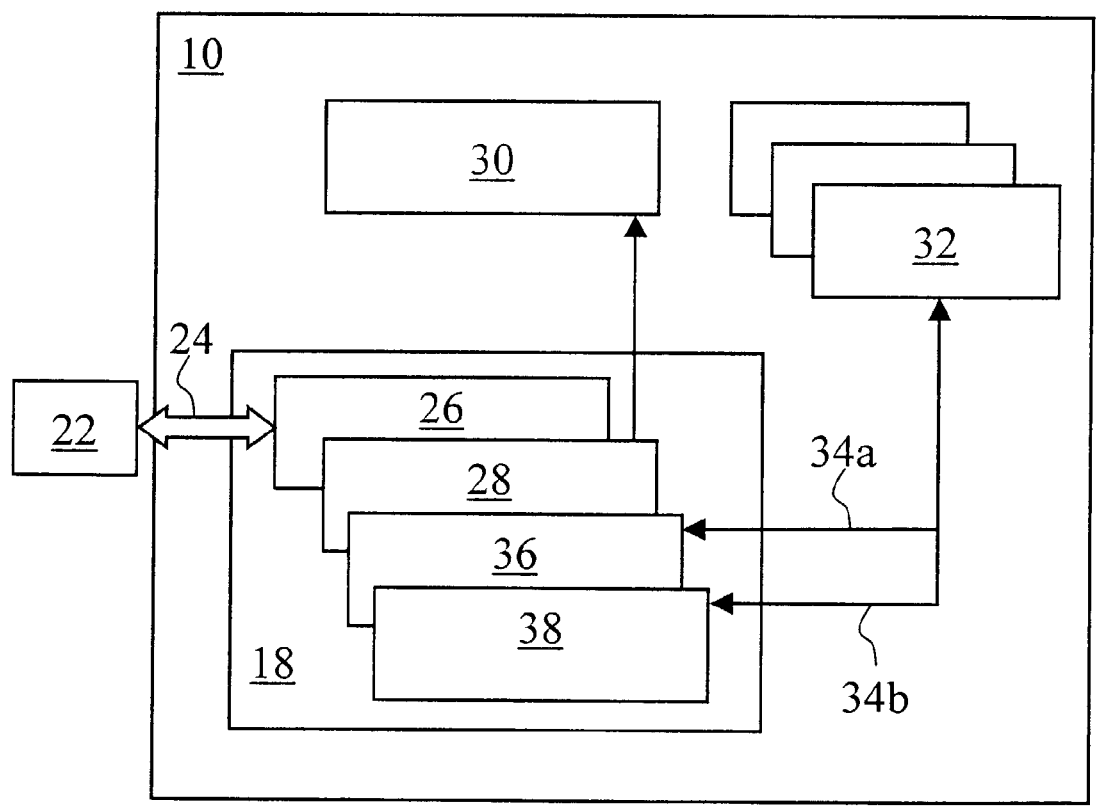
FIG. 3 illustrates an example of the processing flow within the Token of FIG. 1.

FIG. 3 illustrates an example of the processing flow within the Token 10 (with software 18), and with the system 22.

Data from the system 22 are transmitted 24 to a Request Handler 26 for general validity and dispatched to the appropriate function modules. Typically the data in each request message from the system 22 includes a cryptographic checksum called the Message Authentication Code or MAC, which is used to detect any unauthorized change made to the request message received. Any message found to have been altered is rejected and the system is required to resubmit the request.

During the initial steps of an encounter between Token 10 and system 22, the Request Handler 26 transmits the data to the Access Control function 28 to authenticate the system as well as to verify and establish the system's access to Profile planes. Authentication is based on cryptographic algorithms designed to verify the authenticity of the system 22 requesting access, and to verify the type of access permitted to the system 22. The cryptographic algorithms require use of 'keys' which are values that have to be kept secret to ensure their effectiveness as a security device. To keep such keys secret, a 'secure memory' location 30 is provided in the Token 10, such that the content of the memory is not accessible to any entity external to the Token 10, and can only be used by the software 18 in the Token 10.

Once access is established, the system's requests for access to Profile Planes 32 are sent 34a,b to either the Retrieval 36 or Update 38 modules depending on the specific request and the system's rights to make the request. Various types of Retrieval requests 34a may be supported, including raw data retrieval in which data in that one of the Profile Planes 32 being accessed is returned unprocessed, or a 'condition check' request in which the Retrieval module 36 simply verifies if a set of Profile States meets the conditions specified in the request, or a 'generate index' request in which the Retrieval module 36 is required to return a derived index based on a combination of index values in the user profile, without revealing to the system 22 the components used to derive the requested index. The formula for this derivation is embedded in the software 18, and is replaceable through administrative functions, also coded in the software 18.

The system 22 may submit data for updating the Profile Planes 32 if its access rights permit, and such requests are processed by the Update module 38. The Update module 38 takes the incoming data and applies it to the appropriate Profile index or indices depending on the Update request, based on formulae embedded in the software 18.

The user profile is a composite of values, each of which describes an attribute of the user. These values are called Profile States. Profile States can be organized for ease of access and processing. An example of such an organization is as follows:

each Profile State may be a single value representing an attribute of the user, or it may be made up of a number of values which together describes the attribute; and Profile States may be organized into sets, each set called a Profile Line.

Sets of Profile Lines may in turn be grouped into a Profile Plane 32. Each Plane 32 has a header and indexing mechanism for locating a Plane, Line or State.

Each Line has a header that indicates common attributes such as indices to formulae and/or factors of formulae for derivation of the Profile States, such formulae and factors being stored in either the Token 10 or the system 22, and specific requirements of particular implementations.

Access rights of a system 22 may be assigned at any of these grouping levels, and access can further be categorized by functionality, such that a system 22 may be given access to a specific State, Line or Plane for a specific function, but may have a different functional access right to another Profile set (State, Line or Plane). The set of indices for locating a particular Profile State (or Line or Plane) is referred to as Coordinates.

Figure 4:
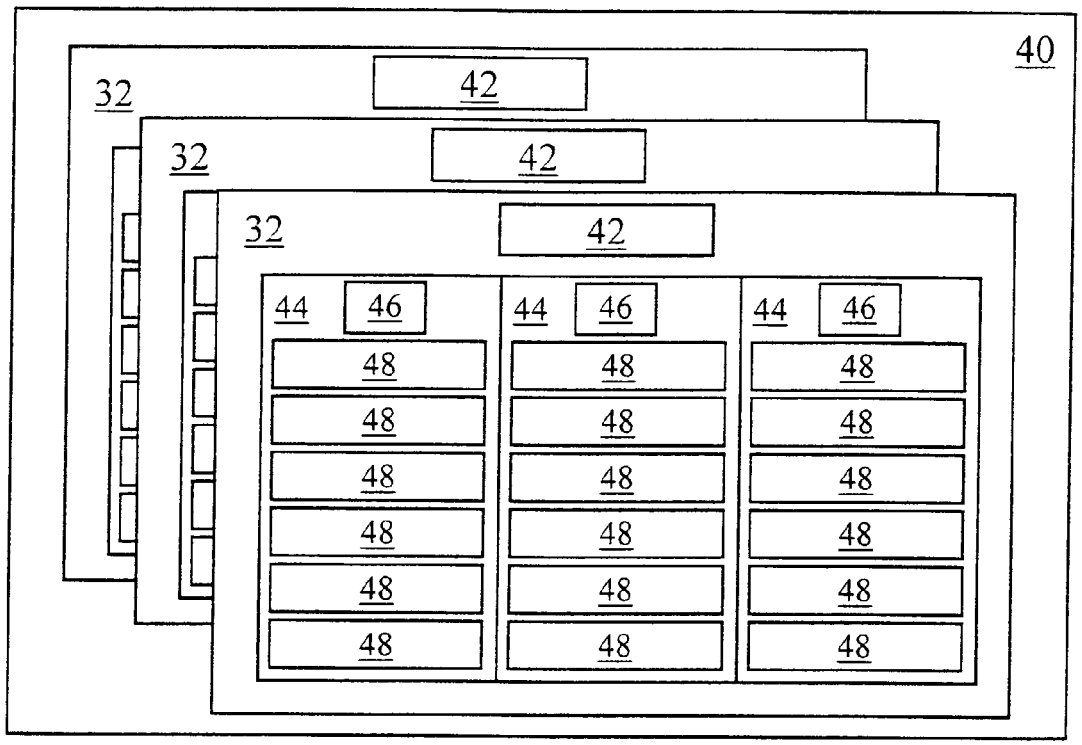
FIG. 4 schematically illustrates an example of the organization of user profile information in the Token of FIG. 1.

FIG. 4 schematically illustrates such an example of profile organization, as described above. In this example, the user profile 40 is made up of a set of Profile Planes 32, each having a header 42 and multiple Profile Lines 44. Each Profile Line 44 has a header 46 and multiple Profile States 48.

Sharing between providers may be effected at Plane 32, Line 44 or State 48 level.

Each Plane 32 or Line 44 or State 48 may be assigned to a different provider, and some Planes 32 and/or Lines 44 and/or States 48 may be available for sharing with all or selected providers and may contain derivative information of general usefulness to all participating providers.

Each Profile State 48 may be comprised of component indices or a single integer index.

A composite Profile State 48 is associated with a derivation formula which may be implemented in the Token 10 or the system 22, and the formula may contain other Profile States 48 as arguments. For example, providers A, B and C may 'own' Profile Planes A, B and C respectively, whilst the issuer of the Token, provider M, owns Profile Plane M. Within Profile Plane M, provider M may choose to define a composite Profile Line L which is a derivative of selected Profile States from Profile Planes A, B, C and some Profile States from Profile Plane M itself, and this Profile Line L could be made available for reference to all providers as a value-added service. Such a collaborative arrangement maximizes the synergy between the participating providers. In addition to personal data such as gender, age, household income, family size, etc, Profile States can be used to track user activity by activity type, provider, provider location, channel (access type—Web, physical outlets, mobile etc), method of payment (credit card, debit card, cash etc), product, product category, time period, frequency, amount (value), quantity, occasions, marketing campaigns, etc. By using the appropriate Profile States in the computation formulae, such data can be used to determine rewards, responses and entitlements.

Authentication Sequence

When a Token is first introduced to a system, a sequence of mutual authentication must take place for one to identify and verify the authenticity of the other.

The typical Token-system mutual authentication sequence is one where Token 10 and system 22 each authenticates or verifies the authenticity of the other, based on an exchange of cryptographic information designed to provide secure and verifiable identity. The objective of this exchange is essentially in order to protect the information in the Token from unauthorized use, and to protect the system from false Tokens.

TABLE 1 below outlines a typical sequence using symmetric cryptographic systems (such as Triple DES or AES/Rijndael standards):

| System 22 | Token 10 |
| --- | --- |
| 01 Detects presence of Token | |
| 02 Requests Token for identification data. | |
| 03 | Responds to request with identification code (Token Id) and a random value R0 comprising 16 bytes of value. |
| 04 Derives the 16-byte Authentication Key (AK), a cryptographic function of the Token Id and a 24-byte Master AK stored in the system; generates random 16-byte value R1 & computes a 16-byte session key SK, a cryptographic function of AK and R1, & encrypts R0 with SK to derive <R0> (also 16 bytes long). Sends R1 and 1st 8 bytes of <R0> to Token. | |
| 05 | Computes SK from R1 and its own AK, encrypts its copy of R0 & compares result with received 8 bytes of <R0>. If not the same, system deemed false, & Token stays silent. If they are the same, Token returns the 2nd 8 bytes of <R0>. |
| 06 Verifies that received 8 bytes of <R0> are correct and Token is deemed genuine. Upon confirmation, ready for sequence to establish its access rights to Profile (see Table 2 below). | |

Access Rights Validation

The system 22 performs a 'Select' request to the Token 10 in order to access a set of Profile States.

| System 22 | Token 10 |
| --- | --- |
| Compute an AccessionKey (ASK), a cryptographic function of <R0> and Access Key (which is stored in System at time of initialisation or loaded into System through secure means). ASK is used to encrypt Access Certificate (AC) in cipher-block-chaining (CBC) mode with <R0> as initial vector, and 1st 4 bytes of last resulting block (the Message Authentication Code or MAC) is sent to Token with system's provider Id (SPI) and AC. | |
| | Using Master ASK (MASK), compute Access Key from MASK and SPI received from system, then derive ASK using Access Key and <R0>; |
| | using derived ASK, verify received MAC by generating it as was done in system. If MAC is valid, verify AC as follows: Derive AccessCertSignKey (ACSK) from Master AccessCertSignKey stored in Token and SPI received from system, and use ACSK to perform CBC encryption on AC, excluding last 8 bytes. Use final result block of CBC, verify that it is same as last 8 bytes of AC. If it is, AC is valid. |

AccessCert contains the following:

SPId—provider (SP) Id: assigned by the Operator to the provider who is using the system to conduct its business or activities;

ValidityIndex—indicates the period within which the Access Certificate is valid, so that AccessCertificates can be expired and providers may be given Access Certificates of limited validity periods; validation of the ValidityIndex is done in the Token in cases where the Token has a real-time calendar clock, otherwise it is done in the System;

Number of Entries (N)—an integer indicating number of entries in this AccessCert;

Coordinates—comprise PlaneNumber:LineNumber:StateNumber—repeat N times; these are coordinates to Profile Plane, Line or State to which system has access; a Plane without Line or State indicates access to entire plane, a Plane and Line without State indicates access to entire Line in given Plane, a Plane, Line and State indicates access to specific State;

Function Type 1 . . . N—(repeat N times); each entry corresponds to an entry in the Coordinates list and indicates type of access available to that Plane, Line or State; and Signature—a cryptographic checksum of preceding elements in AccessCert computed using a MasterAccessSignKey by the owner of this set of Profile States, issued to SP.

The Token uses this AccessCertificate to determine the Plane, Line and State to which system has access, and functions permitted. This example illustrates a typical, secure and efficient implementation for Token-system authentication and access rights determination. In this example, the Signature is computed from a secret key (Access Certificate Signature Key or ACSK) specifically assigned to the vendor by the Profile owner. The ACSK can be a Triple DES or AES key. This Key is derived from a Master Access Certificate Signature Key or MACSK, and the SP Id. The MACSK is stored in the Token and is used to derive the ACSK when the AccessCertificate is presented during the Token-system interaction. The ACSK is used to derive the Signature in the AccessCertificate using the other data elements in the certificate through CBC-mode encryption, where the signature is the last result block of the CBC operation.

CBC-mode encryption, or cipher-block-chaining mode encryption is an industry-standard approach to encrypting blocks of data using secret key encryption algorithms such as DES or Triple DES, and will not be explained here.

Public Key Algorithm

There are other possible implementation approaches to embody this invention. Other approaches include the use of public key algorithms such as RSA or Elliptic Curve Cryptography, where use of master keys are replaced with the use of a public key scheme. In a public key scheme, the Certificate is signed by the issuer using its Signature key and the Token verifies the Signature using the Public Key Certificate issued by issuer and preloaded in the system, and presented to the Token with the Access Certificate.

The Token is able to verify the issuer's Signature Public Key Certificate by use of a Certificate issued by a Certification Authority, which is typically a neutral party trusted by all participants in the system, and who is entrusted with the responsibility for issuing Certificates to the various parties based on operational requirements, including the CA Certificate which is used to verify the authenticity of the Certificates presented to the Token by the system and vice-versa. The methodology for using public key verification is common knowledge amongst practitioners of the discipline.

Further examples of typical applications of the method of the above described embodiments are as follows:

Example 1

The following is an example of an embodiment where the users are customers, at least one provider is a retailer, and the activity is a transaction involving the purchase of goods. In a typical interaction at a point of sale at a retailer, the Profile in the Token held by the customer is used to ensure customer is given the optimum incentive for maximizing potential future patronage.

Figure 5:
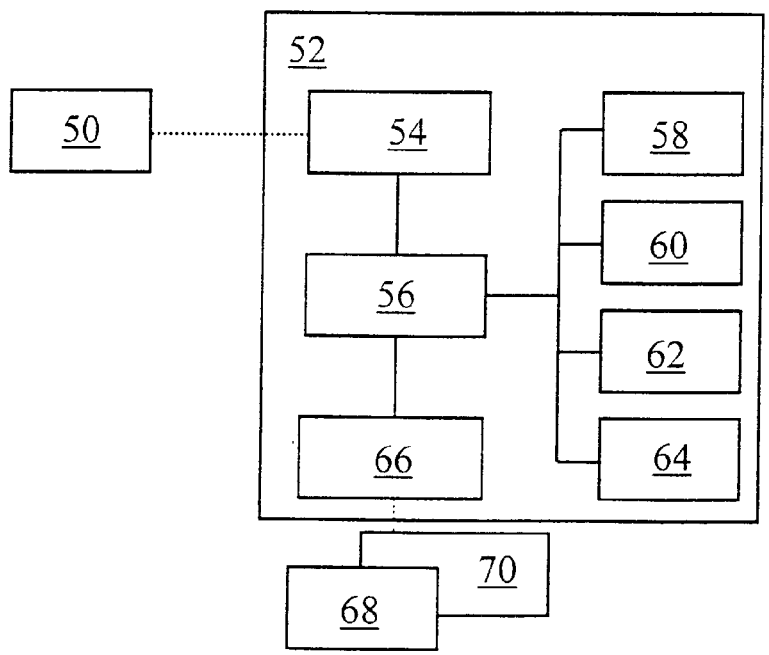
FIG. 5 is a schematic illustration of a further preferred embodiment of the method of the present invention.

In this example, illustrated schematically in FIG. 5, the Token is a chip card and the system comprises a point-of-sale terminal (POS) and the systems to which it is connected, which may include the electronic cash register, payment host and loyalty or CRM application host.

The chip card 50 is a typical embodiment of the Token, and a typical profile structure described above. The chip card 50 communicates with the point-of-sale terminal 52 through a card reader/writer unit 54 by means of electrical contacts, radio frequency or infra-red light signals.

The chip card 50 Token holding the customer profile may also incorporate other applications, such as credit card or debit card payment functions, membership identification, etc. and is compatible with the chip card reader/writer unit 54 in the point-of-sale terminal 52.

The point-of-sale terminal 52 can be of any make typically used for payment transaction processing, such as those used for credit card transactions which are equipped with a programmable processor unit 56.

The memory 58 in the POS terminal 52 is loaded with a computer program containing instructions for controlling the behaviour of the system and data. Control of the process at the POS terminal 52 is through algorithms encapsulated in scripts, which are lines of instructions that are interpreted by a script engine loaded in the POS terminal 52. These scripts are replaceable and downloaded as and when a change is required, and permit greater flexibility in changing the processing rules at the POS terminal 52 without the need for replacing the actual software in the POS terminal 52.

The typical POS terminal 52 also includes a display 60, keyboard 62, receipt printer 64, and communication interface 66 capability to work with a remote/external host computer system 68 such as Electronic Cash Registers (ECRs) 70, payment transaction authorization hosts and loyalty application hosts which may be in remote locations.

The transaction proceeds as follows:
Initiation:
Start of business transaction; and
customer's Token is presented to system.
Authentication Sequence:
System initiates Token-system authentication sequence as described above.
User Interaction Sequence:
After successful Token-system authentication, the system (POS terminal 52 in this example) may optionally (depending on the implementation) prompt the operator by means of display 60 to enter a PIN.

Depending on the provider's requirements, the POS terminal 52 may be configured to prompt for PIN on every activity, or it may, for customer convenience or risk management be configured to prompt for a PIN only after every N activities or after some total value of activities exceeds a limit set either in the Token as part of the profile or in the POS. The PIN may be verified by the Token or the system; if done in the Token, it is generally done by comparing the PIN with a value previously stored in the Token; if done in the system, it is typically done by comparing with a value cryptographically generated using a Master PIN key and information such as the Token Id from the Token. The operator is then prompted to enter the transaction details (product, purchase price, quantity, etc) through keyboard or through the ECR (if one is connected, in which case the information is received through an external host interface).

Interaction between Token and system can involve various scenarios, one of which is listed in the following:

Based on the transaction information such as product code, quantity and price, system selects the relevant Profile State coordinates and sends request to Token for a check against the customer's entitlement.

Profile States selected return the optimum entitlement index to offer the customer, based on, for example, any combination of the customer's personal data, past activity data, predicted activity, and responses data. Alternatively, where the computational capacity of the Token is too limited to effect this computation of the entitlement index, the relevant component Profile-State values may be returned to the system for computation. Examples of typical formulae for this computation would include empirically derived factors and use of attribute information from the activity, and would have the following form:

E=function (a, b, C, ... $P_0$, $P_1$)

where a, b, c, ... are empirical factors derived from historical data such as, for example, by analysis of customers with broadly similar attributes and purchasing patterns as the customer, and $P_0$ and $P_1$ are respectively some attribute of a past and the present activity.

'E' then forms the basis for the system to decide on the customer's entitlement. For example, the customer may be entitled to $X off the next purchase of $Y at Partner A. These rules would be embedded in rules loaded into the POS terminal 52, either as rule scripts or as a look-up table.

'E' may also form the basis for selecting an appropriate cross-selling proposition for the customer. A look-up table in the system is used to select the most appropriate cross-selling offer and display or print this offer on the spot at the end of the transaction.

Formulae used in real systems may vary with different provider requirements, different customer segments and different population segments, etc.

The system uses either the user profile data returned from the Token or the entitlement index derived from the Token as described above to compute and display, print or otherwise notify the customer of the customer's entitlement (e.g. a coupon for a discount or a gift) both for present transaction and for future transactions. This computation is effected through rules implemented in the system. These rules may be formulated based on an understanding of the customers' propensities, preferences and needs gleaned from empirical data gathered from samples of customer behaviour and attribute data. The formulae may include risk management criteria that are used to decide when the system must require additional user authentication before allowing the processing to proceed further.

Customer's acceptance or rejection of the offer can be updated in the Profile to make subsequent Profile indices even more accurate.

Transaction is completed.

Example 2

In this example, the user is a customer of a provider offering hire purchase goods. The customer (user) profile is used to determine the customer's credit rating in an environment where the provider (in this example a Department Store offering hire purchase of electrical goods) does not have enough information and uses the component of the customer profile of a partner Financial Institution (FI) to determine the credit rating. This interaction may occur in a physical shop, via the Internet or by mobile phone. The point of interaction system in this example may therefore be a physical point-of-sale terminal, a PC on the Internet or on the mobile phone over WAP and GPRS, PDA or some other interactive-capable technology appropriately configured with the software programs implementing this invention.

Initiation:
Token is presented to the system, and the operator (a cashier or customer service officer) is prompted to enter the transaction details such as amount, details of goods, hire purchase period, etc.

Authentication:
The system initiates the Token-system mutual authentication sequence, and continues if the sequence is successfully concluded.

Credit Rating:
The system sends a request to Token for an index of customer's credit rating (C). The index may be a function of the amount of past business done (Q) in a specified period (P), the number of late or delinquent repayments (D), income band (S) if known, occupation (O), and other relevant variables. The index may be a pre-computed value stored in the customer profile (derived from historical data in some host-based process and loaded into the Profile, or a value that had been dynamically generated and updated in the course of previous interactions with the customer), or a dynamically generated value derived based on a formula stored in the system or in the Token and which uses values retrieved from the Profile States as input parameters to the formulae.

The typical form of a formula to derive C is as follows:
$C = \text{function}(a, b, c, \ldots, Q, P, S, O, D)$
where coefficients 'a', 'b', 'c'... are empirically derived from analysis of historical data for customers with profiles similar to the customer's. C translates into an absolute amount in credit worthiness through a table of values or through a formula of the form credit limit $V = \text{function}(p, q, \ldots, C)$, where both the table values and the coefficients (p, q, . . . ,) are empirically determined.

In the event the credit limit V is insufficient, or where the Department Store does not have adequate business history with the customer to determine the value V, the Department Store has an arrangement with the aforementioned FI where the FI authorizes the Department Store to access the part of the Profile owned by the FI, in order to obtain the credit rating C.

This is accomplished by the FI issuing to the Department Store an AccessCertificate containing the appropriate Plane: Line:State coordinates and the relevant Signature of the FI.

The sequence for obtaining the credit rating index C is as follows:

System prompts customer for permission to access FI Profile, which customer gives by entering a PIN; system submits AccessCertificate and PIN to Token, which verifies the customer's PIN, and if valid, the AccessCertificate as described earlier in this document. The method for verification of customer's PIN is accomplished in one of a number of ways:
comparing the PIN value with a value stored in the Token;
if the PIN was encrypted by the system prior to submission to the Token, the Token decrypts the PIN for comparison, or encrypts the PIN stored in the Token for comparison with the encrypted version received from system.

The Token returns the credit rating index (C') of customer, based on customer's profile with the FI (rather than the Profile with Department Store). C' may, for example, be derived based on much more comprehensive information on the customer that is available only to the FI, such as information pertaining to customer's outstanding loans, sources of income, assets and liabilities in general. Such a formula would generally take the form:
$C' = \text{function}(a, b, c, \ldots, R, L, O, A, T, S)$
where coefficients 'a', 'b', 'c' . . . , are empirically derived from statistical analysis of historical data; R is the total monthly income, L is monthly outgoing for debt repayments, O is the occupation index, A is the total asset value, T is the period of time customer has had business with the FI and S is the social status index of customer.

This index may serve as an input to the Department Store's rating formula to revising customer's overall rating: for example the composite credit rating of the customer would then be derived from a formula of the form:
$\text{function}(a, b, c, \ldots, C, C')$,
where 'a', 'b', 'c' . . . , are factors derived from empirical analysis of historical data.

Based on the new credit rating, the Department Store is able to make a better decision as to whether the customer should be offered the credit required.

Example 3

In this example the user is an employee and an employee (user) profile is used to determine the wages of the employee, in an environment where the employee's time log, leaves (medical or otherwise), training records, performance appraisals, special achievements, etc. are captured in an employee profile, based on which the wages are computed. In this example, the device which pays the wages is a provider. The employee could also be a contractor.

Initiation:
Token is presented to the system. The system may be self-service (e.g. an ATM) or at a conventional manned counter at the bank.

Authentication:

The Token-system authentication sequence is completed.

User Interaction;

The system issues request to Token for the wage index in the employee profile, together with Access Certificate;

The Token validates AccessCertificate (as described above) and computes wages based on formula linked to the specified Profile State;

Formula may take as input multiple other Profile States, which may be States tracking hours logged, training credits, leave and absence records, etc, and result is returned to system;

Based on the wage index returned from the Token, the system credits the employee's account with the wages, and the relevant Profile States are updated to indicate the transaction and serve as input to other formulae for computation of other indices (e.g. credit rating at a retailer or financial institution). This application of the invention is particularly useful for environments where access to central records is not available, unreliable, difficult or expensive, for example in off-shore oil rigs, mines, etc. Multiple providers share aspects of the respective user profiles known to each one to process and respond to the user activities.

Example 4

In this example the different parts of the user profile are used to track provider's (individual's) previous actions and reactions to the user, an automated and autonomously operating electronic toy (the Toy), and through which the Toy (the user) is able to personalize its reactions to the provider. In this example, the Toy is a user and the Token is embedded in the dog.

Initiation:

The individual wears a pendant carrying an embedded chip acting as the provider. This chip is able to interact through wireless communications with the Token in the toy dog. The Token in the toy dog contains a 'user profile' containing profile information of each 'provider' or individual. Chip on provider interacts with and identifies/is identified by the Token.

Authentication:

A simple version of Token-system authentication sequence is completed, wherein the Token is identified by the system. In this example, security is not a major concern, and authentication may serve simply to establish the nature of the Token in order that the system may react correctly to it.

User Interaction:

The user profile in the Token (the Toy) indicates to the 'system' (the chip on the pendant) that it has not had a contact in over a week, and causes the toy dog to react by being extra friendly, and may even ask the individual a question regarding his activities or his well-being.

Depending on the individual's response and the Toy's capabilities and algorithms, the interaction between the Token and the system is correspondingly modified by the user profile and each interaction continues to enrich the user profile.

In this case, the user profile in the Token in the toy dog contains multiple profiles from different 'providers', some aspects of which may be shared between providers and some which are private to each 'provider'.

Example 5

In this example the user profile is used to determine the user's identity and record indices indicative of the user's previous preferences, actions and reactions in a building, such that access to different parts of the building may be permitted or denied based on the user profile, and each room the user enters automatically adjusts the lighting, temperature, etc to the preferences of the user. In this example, the controllers which adjust lighting, temperature etc. are one or more providers. The Tokens may be issued by the employer (there may be more than one employer in the building), and only a sub-set of the profile is shared with the general building control in common areas shared between employers. Within the premises of an employer, the user profile may be used to determine user preferences and privileges.

Initiation:

The Token, which is a chip embedded in a pendant or watch worn by user, the chip being capable of wireless communication through radio frequency signals, is presented to the system comprising a building fully automated where possible and which is constantly polling the environs to detect Tokens in the vicinity, based on which the building may automatically readjust the parameters to better suit the user.

Authentication:

The Token-system authentication sequence is completed as a security measure where relevant, wherein the Token is identified by the system. In this example, security in terms of ensuring the correct identity of the Token is a major concern, and authentication may serve to establish the type of access or facility permitted to the user.

User Interaction:

The system (the building) detects from the user profile that the user prefers a particular room temperature, background music, lighting etc and adjusts the room settings accordingly. The system then permits the user access to different parts of the building or access different equipment and facilities based on the Profile.

Such an application may be used in a banking facility where personalized services are offered to the individual user in addition to basic banking functions, such that user is led to private facilities with personal attention paid to user's needs and recorded in the Token, and information stored in the Token is used to decide additional entitlements.

Example 6

In this example the customer profile is used to determine the customer's identity and record customer's consumption of services, which then serves as a basis for billing the customer for the services or goods consumed.

Initiation:

The Token, which in this example is a chip embedded in a card, is presented to a suitably equipped computer terminal (comprising part of the system). The Token and the system communicate through one of the many conventional means including, for example, through a conventional contact chip card reader complying to IS 7816 standards, or a contactless reader complying to IS 14443, or through Bluetooth protocols, infra-red signals etc. In this example, the issuer of the Token may be organisation A (e.g. a bank), whilst the provider may be an Internet service provider or retailer.

Authentication:

The Token-system authentication sequence is completed in order to establish authenticity and identity.

User Interaction:

The customer profile holds the credit limit or entitlement information and the consumption to date. The credit available may be determined as set out in Example 2, based on Profile States shared with more than one provider.

If there is available credit, the customer is allowed access to the service required. Through the course of the access session, the customer profile is updated in discrete unit steps, for example on a 30 second interval basis, etc. At the time of each update, the available credit is checked. If credit is completely used up, the system stops permitting access. Throughout the session, the Token-system are in contact. If contact is lost, access is denied to the customer. Services that may be dispensed in this manner include simple computer-sharing services and application sharing services.

In a variation of this set-up, the Token could be a pass into a sports facility and the system is a turnstile gate. The Token is updated with the latest access information each time customer enters the facilities.

During the activity, the user profile could be used to carry out targeted marketing where the user is exposed to offers from different providers relevant to the profile.

Example 7

In this example a customer profile in the Token held by the customer is used to enable the provider to give the optimum personalised pricing for goods or services to the customer at the point of interaction.
Initiation:
The Token, which in this example is a chip embedded in a card, is presented to a suitably equipped point of sale terminal (comprising part of the system).
Authentication:
The Token-system authentication sequence is completed in order to establish authenticity and identity.
User Interaction:
Based on the transaction information such as product code, quantity and price, system selects the relevant Profile State coordinates and sends request to Token to determine the optimum price index for the customer. The index and hence the price to be offered and displayed are effected through rules in the Token and/or the system. These rules may be formulated based on, but not limited to, the customer's history of purchases and activity, length of relationship with the provider and propensities for future patronage. Customer's acceptance or rejection of the offer can be updated in the Profile to make subsequent Profile indices even more accurate.

This invention may be used for, but is not limited to, applications in the areas of customer relationship management, customer acquisition management, customer retention management, customer reward management, customer risk management, customer profitability management, data repository management, identity management and marketing management.

Modifications within the spirit and scope of the invention may be readily effected by those skilled in the art. It is to be understood, therefore, that this invention is not limited to the particular embodiments described by way of example hereinabove.

For the purposes of this specification it will be clearly understood that the word "comprising" means "including but not limited to", and that the word "comprises" has a corresponding meaning.

The invention claimed is:

1. A method of managing an activity between a portable token and a point-of-sale ("POS") terminal wherein the portable token includes a processor, a memory operatively coupled to the processor, the memory storing code executed by the processor and a user profile comprising a plurality of sets of user profile data, each set of user profile data pertaining to at least one of plurality of providers, said method comprising:
   broadcasting, via short-wavelength radio waves, an activity request, initiated from said portable token by a user, with identification data identifying said portable token requesting a communication with a first POS terminal of a first provider;
   upon mutual authentication between said portable token and said first POS terminal, using a first user profile stored on said portable token representing transactional history between said portable token and said first POS terminal to facilitate assessing the user's activity request based on an index returned from said portable token to said first POS terminal, said index based on said first user profile pertaining to said first provider stored on said portable token;
   receiving a query from said first POS terminal via said short-wavelength radio waves requesting permission to use of one or more other user profile pertaining to one or more other providers stored on said portable token representing transactional history between said portable token and one or more other POS terminals of said one or more other providers;
   upon authenticating said query by said portable token, using said one or more other user profile stored on said portable token to continue facilitating said activity request;
   receiving one or more additional indices from said portable token based additionally on said one or more other user profile; and
   determining a response, by said first POS terminal, to said user's activity request based on said additional indices via said short-wavelength radio waves in an offline environment such that communication occurs between said portable token and said first POS terminal without online access to a remote host.

2. The method as claimed in claim 1, wherein said activity request is assessed according to the set of user profile data pertaining to said first provider when adequate, and wherein for an inadequate set of user profile data maintained by said first provider then assessed according to the user profile data pertaining to said first provider and one or more sets of user profile data pertaining to one or more other providers, or only according to one or more sets of user profile data pertaining to one or more other providers.

3. The method as claimed in claim 2, wherein at least one set of user profile data includes activity data concerning any past activities said user has engaged in with a provider or providers to which the set of user profile data relates, and the step of assessing said user's request is based at least partly on said activity data.

4. The method as claimed in claim 3, wherein at least one set of user profile data includes response data concerning any past responses received by said user, and assessing said request is based at least partly on said response data.

5. The method as claimed in claim 4, wherein at least one set of user profile data includes personal data and assessing said request is based at least partly on said personal data.

6. The method as claimed in claim 5, wherein at least one set of user profile data includes predictive data concerning future activities in which said user is likely to engage with a provider or providers, and assessing said request is based at least partly on said predictive data.

7. The method as claimed in claim 6, wherein each of said sets of user profile data constitutes a sub-profile of said user profile.

8. The method as claimed in claim 7, further including updating said user profile at said point of interaction onto said token.

9. The method as claimed in claim 8, including updating said set of user profile data pertaining to said first provider to include additional information to reflect said activity.

10. The method as claimed in claim 9, including updating said set of user profile data pertaining to said first provider to reflect said activity after said activity is completed.

11. The method as claimed in claim 10, further including determining any response to which said user is entitled.

12. The method as claimed in claim 11, further including updating said set of user profile data pertaining to said first provider to reflect any response received by said user.

13. The method as claimed in claim 12, further including updating the set of user profile data pertaining to at least one other provider.

14. The method as claimed in claim 13, wherein said set of user profile data pertaining to at least one other provider is only modified after said at least one other provider has granted access rights to said first provider.

15. The method as claimed in claim 14, including controlling access to different parts of the user profile data shared by selected providers through use of a digital certificate and user profile data coordinates, to thereby enable access rights to be modified by altering the digital certificate.

16. The method as claimed in claim 15, wherein said user is required to provide consent to the access of data in relation to selected activity requests.

17. The method as claimed in claim 16, wherein said user is required to provide identification data in relation to selected activity requests.

18. The method as claimed in claim 17, wherein said activity is a purchase of goods and/or services from a provider of goods and/or services.

19. A method of managing a communication between a mobile phone and a point-to-sale ("POS") terminal via short-wavelength radio waves, wherein said mobile phone includes a processor, a memory operatively coupled to the processor, the memory storing code executed by the processor and a user profile comprising a plurality of sets of user profile data, each set of user profile data pertaining to at least one of plurality of providers, said method comprising:
broadcasting, via said short-wavelength radio waves, an activity request, initiated from said mobile phone by a user, with identification data identifying said mobile phone requesting a communication between said mobile phone and a first POS terminal of a first provider;
upon mutual authentication between said mobile phone and said first POS terminal, using a first user profile stored on said mobile phone representing transactional history between said mobile phone and said first POS terminal to facilitate assessing the user's activity request based on an index returned from said mobile phone to said first POS terminal, said index based on said first user profile pertaining to said first provider stored on said mobile phone;
receiving a query from said first POS terminal via said short-wavelength radio waves requesting use of one or more other user profile pertaining to one or more other providers stored on said mobile phone representing transactional history between said mobile phone and one or more other POS terminals of said one or more other providers;
upon authenticating said query by said mobile phone, using said one or more other user profile stored on said mobile phone to continue facilitating said activity request;
receiving one or more additional indices from said mobile phone based additionally on said one or more other user profile; and
determining a response, by said first POS terminal, to said user's activity request based on said additional indices via said short-wavelength radio waves in an offline environment such that communication occurs between said mobile phone and said first POS terminal without online access to a remote host.

20. The method as claimed in claim 19, further comprising providing a user's entitlement assessed according to the set of user profile data pertaining to said first provider when adequate, and wherein for an inadequate set of user profile data maintained by said first provider then assessed according to the user profile data pertaining to said first provider and one or more sets of user profile data pertaining to one or more other providers, or only according to one or more sets of user profile data pertaining to one or more other providers.

21. The method as claimed in claim 20, wherein at least one set of user profile data includes activity data concerning any past activities said user has engaged in with a provider or providers to which the set of user profile data relates, and the determination of any response to which said user is entitled is based at least partly on said activity data.

22. The method as claimed in claim 21, wherein at least one set of user profile data includes response data and said determination of any response is based at least partly on said response data.

23. The method as claimed in claim 22, wherein at least one set of user profile data includes personal data and said determination of any response is based at least partly on said personal data.

24. The method as claimed in claim 23, wherein at least one set of user profile data includes predictive data concerning future activities in which said user is likely to engage with a provider or providers, and said determination of any response is based at least partly on said predictive data.

25. The method as claimed in claim 24, wherein each of said sets of user profile data constitutes a sub-profile of said user profile.

26. The method as claimed in claim 25, further including updating said user profile.

27. The method as claimed in claim 26, including updating said set of user profile pertaining to said first provider to include additional information to reflect said activity.

28. The method as claimed in claim 27, including updating said set of user profile data pertaining to said first provider to reflect said activity after said activity is completed.

29. The method as claimed in claim 28, further including updating said set of user profile data pertaining to said first provider to reflect any response provided to said user.

30. The method as claimed in claim 29, further including updating the set of user profile data pertaining to at least one other provider.

31. The method as claimed in claim 30, wherein said set of user profile data pertaining to at least one other provider is only modified after said at least one other provider has granted access rights to said first provider.

32. The method as claimed in claim 31, including controlling access to different parts of the user profile data shared by selected providers through use of a digital certificate and user profile data coordinates, to thereby enable access rights to be modified by altering the digital certificate.

33. The method as claimed in claim 32, wherein said user is required to provide consent to the access of data in relation to selected requests to engage in an activity.

34. The method as claimed claim 33, wherein said user is required to provide identification data in relation to selected requests to engage in an activity.

35. The method as claimed in claim 34, wherein said determination of any response involves a determination of any benefit redeemable by said user.

36. The method as claimed in claim 34, wherein said activity is a purchase of goods and/or services from a provider of goods and/or services.

37. A personal portable data storage device for allowing a user to utilize said storage device to communicate with a point-of-sale ("POS") terminal wherein said storage device contains a processor, a memory operatively coupled to the processor, the memory storing code executed by the processor and a user profile comprising a plurality of sets of user profile data, each set of user profile data pertaining to at least one of plurality of providers for performing the steps comprising:
    making an activity request via short-wavelength radio waves communication between said storage device and said POS terminal wherein the personal data storage device provided with identification data identifying said user;
    upon mutual authentication between said storage device and said first POS terminal, using a first user profile stored on said device representing transactional history between said storage device and said first POS terminal to facilitate assessing the user's activity request based on an index returned from said storage device to said first POS terminal, said index based on said first user profile pertaining to said first provider stored on said storage device;
    receiving a query from said first POS terminal via said short-wavelength radio waves requesting use of one or more other user profile pertaining to one or more other providers stored on said storage device representing transactional history between said storage device and one or more other POS terminals of said one or more other providers;
    upon authenticating said query by said storage device, using said one or more other user profile stored on said storage device to continue facilitating said activity request;
    receiving one or more additional indices from said storage device based additionally on said one or more other user profile; and
    determining a response, by said first POS terminal, to said user's activity request based on said additional indices via said short-wavelength radio waves in an offline environment such that communication occurs between said storage device and said first POS terminal without online access to a remote host.

38. The device as claimed in claim 37, wherein each of said sets of user profile data constitutes a sub-profile of said user profile.

39. The device as claimed in claim 38, wherein said personal data storage device has magnetic, optical or electronic memory storage for storing said user profile.

40. The device as claimed in claim 39, wherein the personal data storage device is embedded in one of a card, a credit card, a mobile terminal, a personal digital assistant, a watch, a toy or a pendant.

41. A data storage system for managing exchange of data between a plurality of users and a plurality of providers, the system comprising:
    a personal portable data storage device for each user, each data storage device storing user profile data pertaining to one particular user;
    a point-of-sale ("POS") terminal coupled to said personal portable data storage device via short-wavelength radio waves and configured to have at least one processing unit operable to interact with the personal portable storage devices to receive data therefrom, wherein the data storage device stores data in a plurality of sets, including a set of data comprising identification data identifying a user and a plurality of user profile data sets, one set for each of the providers; and
    wherein said personal portable data storage is configured to perform the steps comprising:
    broadcasting, via said short-wavelength radio waves an activity request, initiated from said personal portable data storage by a user, with identification data identifying said personal portable data storage requesting a communication between said personal portable data storage and a first POS terminal of a first provider;
    upon mutual authentication between said personal portable data storage and said first POS terminal, using a first user profile stored on said personal portable data storage representing transactional history between said personal portable data storage and said first POS terminal to facilitate assessing the user's activity request based on an index returned from said personal portable data storage to said first POS terminal, said index based on said first user profile pertaining to said first provider stored on said personal portable data storage;
    receiving a query from said first POS terminal via said short-wavelength radio waves requesting use of one or more other user profile pertaining to one or more other providers stored on said personal portable data storage representing transactional history between said personal portable data storage and one or more other POS terminals of said one or more other providers;
    upon authenticating said query by said personal portable data storage, using said one or more other user profile stored on said personal portable data storage to continue facilitating said activity request;
    receiving one or more additional indices from said personal portable data storage based additionally on said one or more other user profile; and
    determining a response, by said first POS terminal, to said user's activity request based on said additional indices via said short-wavelength radio waves in an offline environment such that communication occurs between said personal portable data storage and said first POS terminal without online access to a remote host.

* * * * *